(12) United States Patent
Eberlein et al.

(10) Patent No.: US 11,206,305 B1
(45) Date of Patent: Dec. 21, 2021

(54) LATENCY MINIMIZATION IN DATACENTERS

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/023,680

(22) Filed: Sep. 17, 2020

(51) Int. Cl.
G06F 15/173 (2006.01)
H04L 29/08 (2006.01)
H04L 12/26 (2006.01)
H04L 12/24 (2006.01)

(52) U.S. Cl.
CPC .......... H04L 67/1095 (2013.01); H04L 43/04 (2013.01); H04L 43/067 (2013.01); H04L 43/14 (2013.01); H04L 41/5096 (2013.01)

(58) Field of Classification Search
CPC ..... H04L 67/1095; H04L 43/14; H04L 43/04; H04L 43/067; H04L 41/5096
See application file for complete search history.

(56) References Cited

U.S. PATENT DOCUMENTS 9,397,930 B2 7/2016 Drobinsky et al.
11,061,871 B2 * 7/2021 Awasthi ................ G06F 3/067
2014/0082165 A1 3/2014 Marr et al.
2020/0065415 A1 * 2/2020 Estanislao ............... G06F 17/10
2020/0125582 A1 * 4/2020 O'Shaughnessy .... G06F 3/0619

FOREIGN PATENT DOCUMENTS

WO 2017141249 8/2017

OTHER PUBLICATIONS

Extended European Search Report issued in European Application No. 20213711.3 dated May 7, 2021, 8 pages.

* cited by examiner

*Primary Examiner* — Anh Nguyen
(74) *Attorney, Agent, or Firm* — Fish & Richardson P.C.

(57) ABSTRACT

Methods, systems, and computer-readable storage media for monitoring, by a LML plug-in to a first service executed within a first datacenter, accesses to provide access data representative of the accesses to a data record stored in the first datacenter, the accesses including local accesses executed by the first service and remote accesses executed by a second service executed within a second datacenter, receiving, by a LML instance executed within the first datacenter, the access data from the LML plug-in to the first service, determining, by the LML instance, a set of metrics for the data record based on the local accesses and the remote accesses in a first time period, and selectively executing a transfer process based on the set of metrics to copy the data record to the second datacenter.

17 Claims, 11 Drawing Sheets

| Data Location | Record Key | DC1 Percentage | DC2 Percentage | DC3 Percentage | Action |
|---|---|---|---|---|---|
| DC1 | K1 | 2% | 98% | 0% | Move to DC2 |
| DC1 | K2 | 12% | 85% | 3% | Move to DC2 |
| DC1 | K3 | 35% | 31% | 34% | - |
| DC1 | K4 | 50% | 5% | 45% | - |
| DC1 | K5 | 47% | 51% | 2% | - |

FIG. 3B

| Data Location | Record Key | DC1 Percentage | DC2 Percentage | DC3 Percentage | Action |
|---|---|---|---|---|---|
| DC1 | K1 | 2% | 98% | 0% | Push to DC2 and opt-out |
| DC1 | K2 | 12% | 85% | 3% | Push to DC2 |
| DC1 | K3 | 35% | 31% | 34% | Push to DC2 + DC3 |
| DC1 | K4 | 50% | 5% | 45% | Push to DC3 |
| DC1 | K5 | 47% | 51% | 2% | Push to DC2 |

FIG. 3C

| Data Location | Record Key | Accessing Instance | Network latency | Timestamp |
|---|---|---|---|---|
| DC1 | K1 | DC2 | 1.2 | 2020-04-23 16:45:23 |
| DC1 | K2 | DC2 | 1.4 | 2020-04-23 17:25:23 |
| DC1 | K3 | DC1 | 0.0 | 2020-04-23 19:51:13 |
| DC1 | K4 | DC3 | 0.2 | 2020-04-23 20:42:20 |

*FIG. 4*

| Location | Record Key | DC1 | DC2 | DC3 | DC4 | DC5 | DC6 | DC7 | DC8 | Total local access | Action |
|---|---|---|---|---|---|---|---|---|---|---|---|
| DC1 | K1 | 9000 | 500 | 30 | 200 | 0 | 0 | 0 | 0 | 9000 | - |
| DC1 | K2 | 50 | 900 | 30 | 2 | 0 | 0 | 0 | 0 | 50 | Push to DC2 and opt-out |
| DC1 | K3 | 800 | 830 | 880 | 708 | 803 | 865 | 888 | 5312 | 800 | Push to DC8 and opt-out |
| DC1 | K4 | 700 | 800 | 1100 | 800 | 900 | 1000 | 1200 | 1200 | 700 | Push to DC2-DC8 |
| DC1+DC2+DC3 | K5 | 500 | 500 | 500 | 3000 | 3000 | 2500 | 0 | 0 | 1500 | Push to DC4-6 and opt-out DC1-3 |
| DC1-DC8 | K6 | 50 | 50 | 50 | 50 | 5000 | 50 | 50 | 50 | 5350 | Opt-out everywhere but DC5 |

*FIG. 5A*

| Data Location | Record Key | DC1 | DC2 | DC3 | DC4 | DC5 | DC6 | DC7 | DC8 | Total local access | Action |
|---|---|---|---|---|---|---|---|---|---|---|---|
| DC1 | K1 | 9000 | 500 | 30 | 200 | 0 | 0 | 0 | 0 | 9000 | - |
| DC1 | K2 | 50 | 900 | 30 | 2 | 0 | 0 | 0 | 0 | 50 | Push to DC2 and opt-out |
| DC1 | K3 | 800 | 830 | 880 | 708 | 803 | 865 | 888 | 5312 | 800 | Push to DC8 and opt-out |
| DC1 | K4 | 700 | 800 | 1100 | 800 | 900 | 1000 | 1200 | 1200 | 700 | Push to DC2-DC8 |
| DC1+DC2+DC3 | K5 | 500 | 0 | 0 | 3030 | 3000 | 0 | 0 | 0 | 1500 | Push to DC4 and DC5 |
| DC1-DC8 | K6 | 50 | 0 | 0 | 0 | 0 | 0 | 0 | 0 | 5350 | Opt-out |

*FIG. 5B*

| Data Location | Record Key | DC1 | DC2 | DC3 | DC4 | DC5 | DC6 | DC7 | DC8 | Total local access | Action |
|---|---|---|---|---|---|---|---|---|---|---|---|
| DC1+DC2+DC3 | K5 | 0 | 0 | 500 | 0 | 0 | 2500 | 0 | 0 | 1500 | Push to DC6 |
| DC1-DC8 | K6 | 0 | 0 | 50 | 0 | 0 | 0 | 0 | 0 | 5350 | Opt-out |

*FIG. 5C*

| Latency per Location | Asia | Asia | Asia | Europe | Europe | Europe | US | US | US | US |
|---|---|---|---|---|---|---|---|---|---|---|
| | DC1 | DC2 | DC3 | DC4 | DC5 | DC6 | DC7 | DC8 | DC9 | DC10 |
| DC1 | 0 | 0.2 | 0.3 | 1.5 | 1.6 | 1.7 | 2.1 | 2.2 | 2.0 | 2.3 |

*FIG. 6A*

| Latency per Location | Asia | Asia | Asia | Europe | Europe | Europe | US | US | US | US |
|---|---|---|---|---|---|---|---|---|---|---|
| | DC1 | DC2 | DC3 | DC4 | DC5 | DC6 | DC7 | DC8 | DC9 | DC10 |
| DC8 | 2.2 | 2.3 | 2.4 | 1.1 | 1.2 | 1.7 | 0.1 | 0 | 0.2 | 0.2 |

LATENCY MINIMIZATION IN DATACENTERS

BACKGROUND

Modern software systems are typically a mesh of services that can be spread across multiple, geographically disparate datacenters. Each of the services can have a service persistency located in a respective datacenter to store data. Global companies generally rely on an offering by service provider (vendor) of the software system, which is deployed in several datacenters. Data accessed by the software system through the services can thus imply remote accesses, which may include access to the data stored in the datacenters located on far-away continents, for example. Such remote data access comes with large latency, which impacts usability and performance of the software system.

To make data globally available with low latency, one approach is to use distributed databases set within the datacenters and the data is cloned and distributed across the distributed databases. By this, the services running in different datacenters can each access the data locally with low latency. However, the distributed databases come with an overhead in costs of redundant storage and intensive data traffic. Therefore, the "brute force" approach that simply distributes all data to multiple datacenters, globally, is not acceptable. Another approach is to cache data locally, but this also has significant technical disadvantages. For example, data that is cached can quickly become stale and update operations of the stale data are slow. Also, if the data is cached, but updated or modified afterwards, the cached data needs to be frequently invalidated.

SUMMARY

Implementations of the present disclosure are directed to minimizing latency in datacenters. More particularly, implementations of the present disclosure are directed to dynamically moving data between datacenters using a latency minimization layer (LML) within instances of a service across datacenters.

In some implementations, actions include monitoring, by a LML plug-in to a first service executed within a first datacenter, accesses to provide access data representative of the accesses to a data record stored in the first datacenter, the accesses including local accesses executed by the first service and remote accesses executed by a second service executed within a second datacenter, receiving, by a LML instance executed within the first datacenter, the access data from the LML plug-in to the first service, determining, by the LML instance, a set of metrics for the data record based on the local accesses and the remote accesses in a first time period, and selectively executing a transfer process based on the set of metrics to copy the data record to the second datacenter. Other implementations of this aspect include corresponding systems, apparatus, and computer programs, configured to perform the actions of the methods, encoded on computer storage devices.

These and other implementations can each optionally include one or more of the following features: determining a set of metrics includes calculating a number of local accesses, a number of remote accesses, and a total number of accesses over the first time period, and determining a percentage of local accesses and a percentage of remote accesses, the selectively executing a transfer process includes executing the transfer process in response to a difference between the percentage of remote accesses and the percentage of local accesses exceeds a first threshold; the first threshold includes a dampening value that changes over time; the data record is stored in both the first datacenter and the second datacenter after execution of the transfer process; actions further include receiving, from the second datacenter, a total number of accesses of the data record stored in the second datacenter at in a second time period, and selectively executing another transfer process based on the total number of accesses from the second datacenter; actions further include deleting the data record stored in the first datacenter; and determining a set of metrics includes calculating the latency of remote accesses from the second datacenter, and selectively executing the transfer process based on the latency of the remote accesses the second datacenter.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 3A-3C depict example tables illustrating an example of latency minimization in accordance with implementations of the present disclosure.

FIG. 4 depicts an example table depicting example network latencies.

FIGS. 5A-5C depict example tables illustrating another example of latency minimization in accordance with implementations of the present disclosure.

FIGS. 6A and 6B depict example tables illustrating another example of latency minimization in accordance with implementations of the present disclosure.

Like reference symbols in the various drawings indicate like elements.

DETAILED DESCRIPTION

Figure 1:
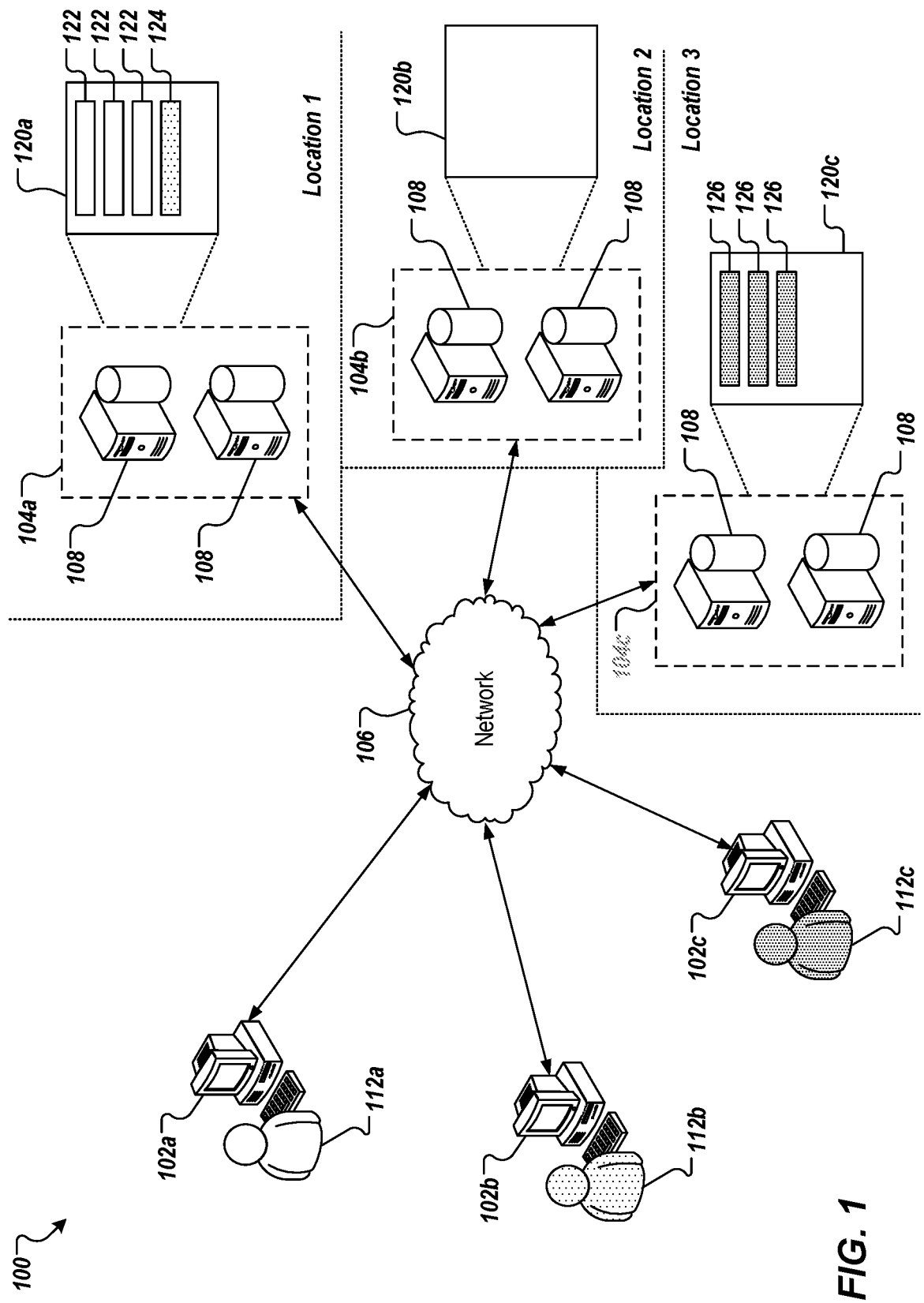
FIG. 1 depicts an example architecture that can be used to execute implementations of the present disclosure.

Implementations of the present disclosure are directed to minimizing latency in datacenters. More particularly, implementations of the present disclosure are directed to dynamically moving data between datacenters using a latency minimization layer (LML) within instances of a service across datacenters. Implementations can include actions of monitoring, by a LML plug-in to a first service executed within a first datacenter, accesses to provide access data representative of the accesses to a data record stored in the first datacenter, the accesses including local accesses executed by the first service and remote accesses executed by a second service executed within a second datacenter, receiving, by a LML instance executed within the first datacenter, the access data from the LML plug-in to the first service, determining, by the LML instance, a set of metrics for the data record based on the local accesses and the remote accesses in a first time period, and selectively executing a transfer process based on the set of metrics to copy the data record to the second datacenter.

To provide further context for implementations of the present disclosure, and as introduced above, remote data access results in latency that can be significant in scenarios where data is stored in multiple, geographically disparate datacenters (e.g., datacenters located on different continents). The data transfer required for data access consumes network bandwidth and is time consuming. This adversely impacts the usability and responsiveness of software systems accessing remotely located data. Slowly responded software systems (e.g., the response time is larger than a second) are perceived as low quality, old fashioned, and/or poorly designed.

In some instances, usage of a software system may vary geographically and not every software system residing in the same region accesses the same data sets. In some examples, an enterprise that uses a software system may have global workforces and facilities, but teams within the enterprise typically work in one or two locations and subsidiaries of the teams are concentrated in a few locations. For example, the facilities and the plants for a product are located at the same location. Requests of access to the data regarding the product can thus be concentrated to a certain extent on a single or only a few locations. Certainly, there should be requests for access sending across the world, for example, access requests from headquarter of the company, but a larger portion of data access are local accesses. Therefore, latency and cost of the local accesses should be improved and optimized.

Continuing with the example above, it can be assumed that the product is planned to be sold globally. Regarding the production and the assembly processes of the product, components of the product can be manufactured in one or two locations. The components are then sent to assembly lines to be assembled into the product. The assembled product can be distributed by a logistics team of the enterprise. Data related to the production of the product will be local to the plants and only part of the data about the components (e.g., some of the master data) will be used across the whole process of production, assembly and distribution. Data created by the assembly line would also be local to the plant and some of the master data of the product would be used in distribution processes too. Thus, large portions of the data are created and accessed dominantly in one or just a few locations.

Continuing with the product example, and with respect to the sale process of the product, sales of the product may be largely localized. Sales for the product may vary from region to region, some products sell well in one region, but not that well in others. Sales related data, like invoices, payment, customer communication or marketing information, will dominantly be created and accessed locally, while being accessible for global evaluation. Thus, it can be required to distribute data to where it is needed by moving the data closer to the location where most accesses occur.

In some examples, there might not be a "single ideal location" for data to provide good/low latency for all users in the distributed workforce of a large enterprise. For example, if two people work with the same software system that has a single database instance and they are geographically distant from one another (e.g., 10,000 km), access latency to the data can be good for one user, but not for both users. That is, if the data is stored more closely to one user, the other user will experience large latency.

Existing approaches attempt to address this. For example, data replication schemes in distributed databases seek to geographically distribute data. But, as discussed above, exhaustively duplicating data to all datacenters would cause significant costs in data storage and network traffic. It is also not practical for a system administrator of the software system to manually duplicate or move the data across the distributed database. For example, the number of users and/or the number of services may be too large to manage, and the locations of users and data might not be static.

Another existing approach is to cache the data locally. Read process of access to the cached data can be faster, but data may be stale and update operations of the stale data are slow. Also, if the data is cached, but updated or modified afterwards, the cached data needs to be frequently invalidated. Typically, invalidation of the cached data needs to be done timely, even if the cached data is not in use or being accessed recently. Large network costs would be generated due to frequent updates and invalidations of the cached data.

In view of the above context, implementations of the present disclosure provide a process to automatically optimize data storage location to reflect access patterns and minimizing latency. Implementation of the present disclosure also optimizes overall latency by taking network and storage costs into consideration.

Implementations of the present disclosure are described in further detail with reference to example use cases. It is contemplated, however, that implementations of the present disclosure can be realized in any appropriate use case.

A first example use case includes business data of a global enterprise. Large global enterprises typically have subsidiaries, factories, stores and offices distributed over several locations, countries, and continents. These global enterprises tend to use software systems (e.g., an enterprise resource planning (ERP) system) to manage data and run business applications without executing local applications at each location. Such software systems are typically provided as a Software-As-A-Service (SaaS) solution deployed to a set of datacenters for high-availability, disaster-recovery, latency, and other reasons. Some software applications may store data in a central database, which may have some replications in other locations, but the main storage is central.

Nowadays, the storage of data is distributed across the datacenters. Data may be created at one location and also accessed at the same location. For example, invoices of customers in location A are created at location A and typically the invoices are also mainly accessed in location A. Sometimes the invoices are also consumed in other another location, location B (e.g., for audit, machine-learning, etc.). The distribution of accesses may lead to a determination of storing the invoices in a datacenter close to the location A. Invoices for customers in country C, however, can be stored in a location closer to country C. Similar examples apply for other business data, such as delivery notes, material management, or logistics. For business data, such as shipment of items, the location of sending the request for access might migrate from the starting location to the destination. Thus, accesses from the destination to the business data may experience high latency, if the business data is not moved accordingly.

A second example use case includes "one inbox" of "one workflow" scheme. In such a use case, software systems tend to become more "user oriented." Previously, the functionality provided in a software system was focused on user experience. More recently, most software vendors are able to provide similar functions in their products, non-functional aspects of the software systems, so performance, accessibility, and/or usability are more in focus for users. User-oriented capabilities, such as "one inbox" and "one workflow," have been developed, in which the presentation of data is tailored for the respective user only. On the other hand, the employees of large global enterprises are typically distributed around the world and do not have a static work location. Also, business data used by the global enterprise is stored in a set of datacenters and consumed/accessed by the users from various locations around the world. As a result of achieving the "one inbox" scheme to randomly located users, the latency of accessing the business data might be acceptable in some occurrences, but for others the network latency might be significant.

FIG. 1 depicts an example architecture 100 in accordance with implementations of the present disclosure. In the depicted example, the example architecture 100 includes client devices 102a, 102b, 102c, a network 106, and server systems 104a, 104b, 104c. Each of the server systems 104a, 104b, 104c includes one or more server devices and databases 108 (e.g., processors, memory). In the depicted example, users 112a, 112b, 112c respectively interact with the client devices 102a, 102b, 102c.

In some examples, the client devices 102a, 102b, 102c can communicate with the server systems 104a, 104b, 104c, respectively, over the network 106. In some examples, the client devices 102a, 102b, 102c each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server systems 104a, 104b, 104c each include at least one server and at least one data store. In the example of FIG. 1, the server systems 104a, 104b, 104c are each intended to represent various forms of servers including, but not limited to a web server, an application server, a proxy server, a network server, and/or a server pool. In general, server systems accept requests for application services and provides such services to any number of client devices (e.g., the client devices 102a, 102b, 102c over the network 106).

In some implementations, the server systems 104a, 104b, 104c each represent at least a portion of a datacenter (DC) that hosts application and/or services to provide functionality. For example, the server system 104a can be considered as (or at least part of) a first datacenter (DC1), the server system 104b can be considered as (or at least part of) a second datacenter (DC2), and the server system 104c can be considered as (or at least part of) a third datacenter (DC3). The server systems 104a, 104b, 104c host respective instances of a service (referred to herein as service instances), the service providing functionality for one or more applications. In some examples, the client device 102a accesses the service instance of the server system 104a (DC1), the client device 102b accesses the service instance of the server system 104b (DC2), and the client device 102c accesses the service instance of the server system 104c (DC3).

In some examples, the service instances access data in one or more of DC1, DC2, and DC3. For example, and as depicted in the example of FIG. 1, the server systems 104a, 104b, 104c include service persistencies (data stores) 120a, 120b, 120c, respectively, which store data records accessed by one or more of the service instances. For example, data records 122 associated with the user 112a are stored in the service persistency 120a, a data record 124 associated with the user 112b is stored in the service persistency 120a, and data records 126 associated with the user 112c are stored in the service persistency 120c.

In some implementations, the client device 102b interacts with the service instance hosted in the server system 104b. In some examples, an interaction can require that the service instance access the data record 124. However, because the data record 124 is not located in the service persistency 120b, the service instance must request the data record 124 from the service instance hosted in the server system 104a. The service instance hosted in the server system 104a receives the request, retrieves the data record 124 from the service persistency 120a, and provides the data record 124 to the service instance hosted in the server system 104b. This process, however, results in latency between the time that the data record 124 is requested and the time that the data record is received, as described herein.

In accordance with implementations of the present disclosure, and as described in further detail herein, each service instance is associated with a respective LML that dynamically move data records between DCs. As described in further detail herein, and with reference to the example of FIG. 1, a LML of a service instance (e.g., the service instance hosted on the server system 104a) can determine that the data record 124 should be presented in the service persistency 120b and can initiate transmitting and storage of the data record 124 within the service persistency 120b. In this manner, subsequent access to the data record 124 by the service instance hosted in the server system 104b will incur a latency that is less than the latency incurred when the data record 124 was accessed from the service persistency 120a.

Figure 2A:
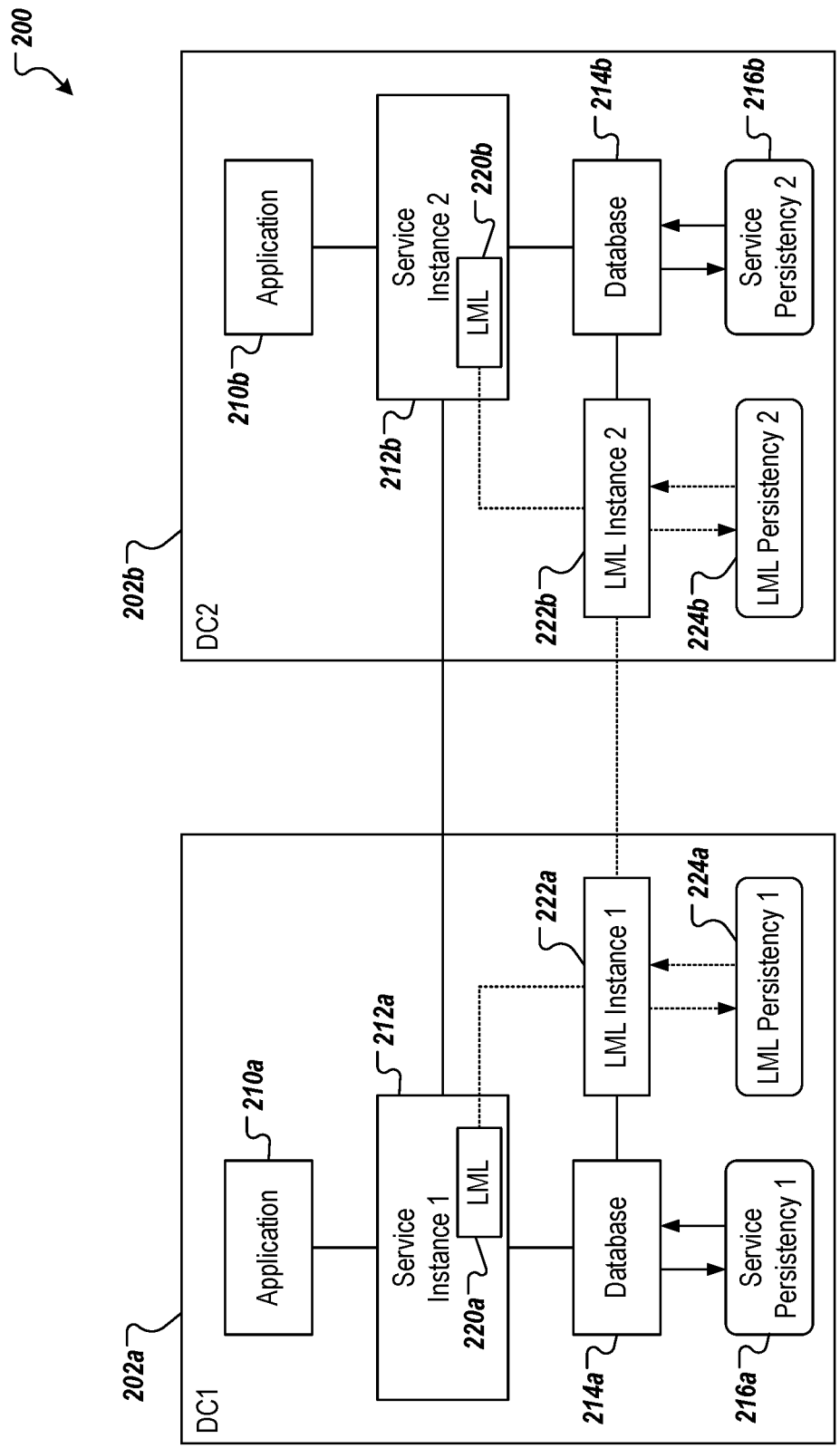
FIGS. 2A and 2B depict conceptual architectures in accordance with implementations of the present disclosure.
Figure 2B:
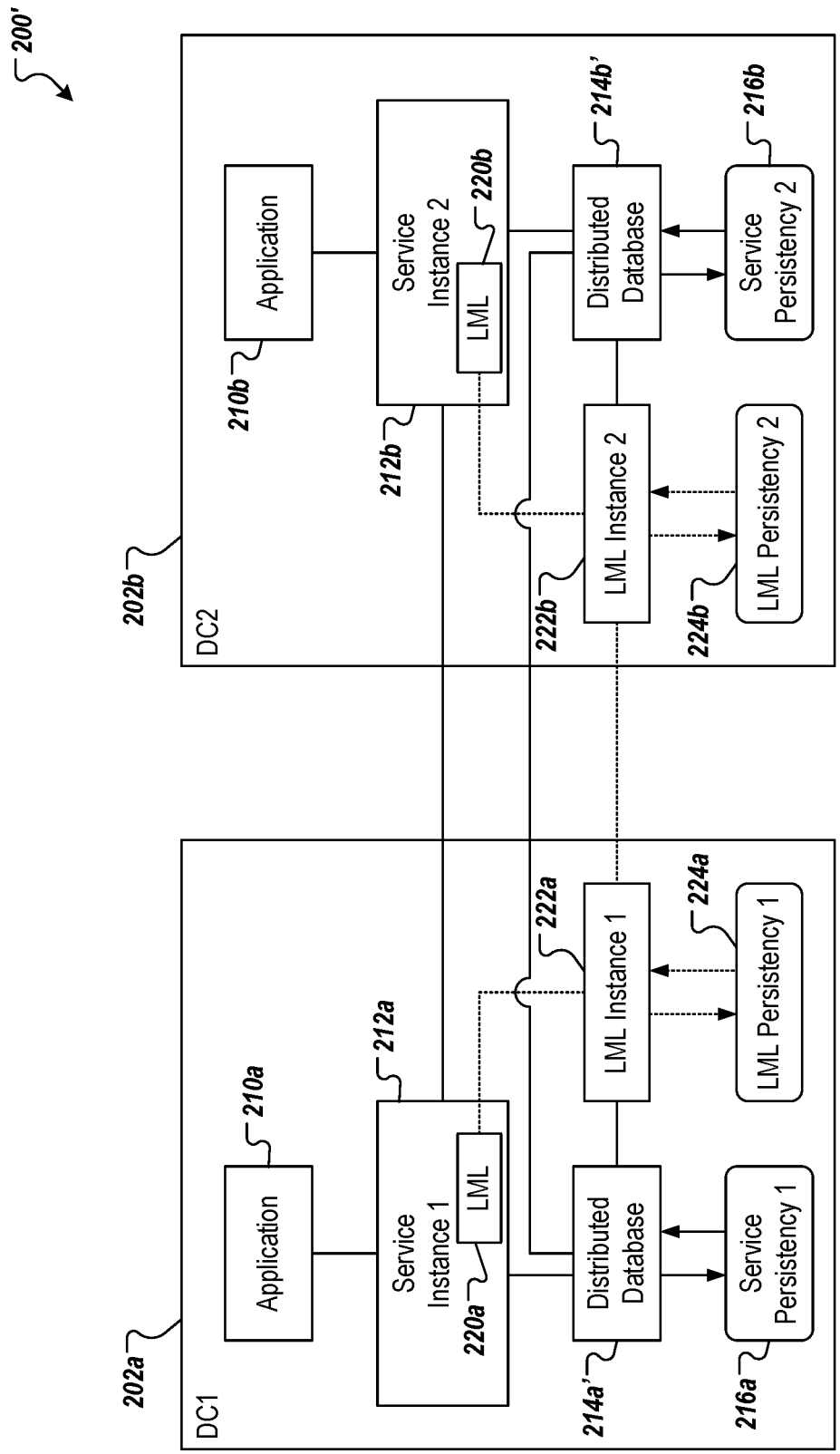

FIGS. 2A and 2B depict conceptual architectures 200, 200' in accordance with implementations of the present disclosure. In FIG. 2A, the depicted conceptual architecture 200 includes server systems 202a and 202b and each represent at least a portion of the datacenter DC1 and DC2. Also, the server systems 202a and 202b can also be referred as one of the implementations of server systems 104a and 104b depicted in FIG. 1. The server system 202a includes an application 210a, a first service instance 212a, a database 214a and a first service persistency 216a. The application 210a is configured to be connected to one or more client device (e.g., the client device 102a in FIG. 1) and act as an interface to interact with the client device and the user (e.g., the client device 102a and the user 112a in FIG. 1). The first service instance 212a is connected to the application 210a and provides functionality for the application 210a. The first service instance 212a is also connected to the database 214a and is capable of accessing the first service persistency 216a through the database 214a. For example, the first service instance 212a receive request for accessing data record that is stored in the first service persistency 216a from the application 210a (which may originally be requested from the user, e.g., the client device 102a and the user 112a in FIG. 1) and the first service instance 212a would then access that data record stored in the first service persistency 126a through database 214a in response to the request.

The server system 202b includes an application 210b, a second service instance 212b, a database 214b and a second service persistency 216b and the relationship of these components is similar to that of server system 202a. The first service instance 212a and the second service instance 212b communicate with one another over one or more networks (e.g., the network 106 of FIG. 1). In some examples, interactions between the service instance 212a and 212b can occur to request data records stored in the service persistency of another server system.

In some implementations, the server system 202a includes an LML 220a, a first LML instance 222a and a first LML persistency 224a, and the server system 202b also includes an LML 220b, a second LML instance 222b and a second LML persistency 224b, respectively. As discussed in further detail herein, the LML instance 222a receives monitoring data to determine whether one or more data records stored in the first service persistency 216a (i.e., locally in the same host server system) should be moved to another server system. Further, the LML instance 222b receives monitoring data to determine whether one or more data records stored in the second service persistency 216b (i.e., locally in the same host server system) should be moved to another server system.

In some implementations, each LML 220a, 220b is provided as a "plug-in" to the first service instance 212a and the second service instance 212b, respectively. The LML 220a monitors accesses to data records stored locally in the first persistency 216a, and the LML 220b monitors accesses to data records stored locally in the second persistency 216b. The accesses may include local accesses (e.g., from the applications 210a, 210b through the service instances 212a, 212b, respectively) and remote accesses that are from other service instances hosted in other server system/datacenters (e.g., the second service instance 212b hosted in the second server system 202b requesting a data record from the first service instance 212a in the first server system 202a). Each of the first LML instance 222a and the second LML instance receives monitoring information to calculate sets of metrics based on the monitoring information. In some examples, the sets of metrics are based on local accesses and remote accesses to each of the data records stored in the first service persistency 216a and the second service persistency 216b. In some implementations, the first LML instance 222a is connected to the second LML instance 222b, and/or one or more other LML instances executed in other datacenters. In some examples, the first LML instance 222a and the second LML instance 222b communicate with one another to share monitoring information and/or sets of metrics corresponding to the data records with other datacenters.

In some implementations, sets of metrics are calculated based on the monitoring information. In some examples, calculations can be performed periodically at fixed time intervals (e.g., 10 minutes, 20 minutes). In some examples, calculations can be performed in response to an event, such as, for example, an access request (e.g., as access information is updated, metrics are calculated). The sets of metrics corresponding to each of the data records may include but are not limited to a number of local accesses, a number of remote accesses, a percentage of local accesses, a percentage of remote accesses, a number and a percentage of remote accesses from particular datacenter, a number and a percentage of accesses of the same data record stored in other datacenters, and latency of the accesses.

In some implementations, and as described in further detail herein, the first LML instance 222a and/or the second LML instance 222b selectively execute a transfer process based the sets of metrics to move one or more data records to another server system. For example, the first LML instance 222a can selectively transfer a data record to the server system 202b. In this manner, and as described in further detail herein, the latency of accessing the data record can be shortened. The evaluation made on selectively executing the transfer processes can be synchronized to the calculation of the sets of the metrics or can be made after particular times of calculations. For example, the calculation of the sets of metrics can be performed periodically, whether to transfer one or more data records can be determined in response to calculation of the sets of metrics.

In some implementations, the conceptual architecture 200 represents an example scenario, in which a data record is stored in a single location (i.e., non-distributed database systems). In such a scenario, the transfer process may include copying the data record to a destination (i.e., another datacenter), and deleting the data record from the current datacenter (also referred to herein as "opt-out"). For example, if a data record of the server system 202a is to be transferred to the server system 202b, the first LML instance 222a triggers the first instance 212a (e.g., send request regarding the transfer process) to copy the data record to the server system 202b and delete the data record from the local service persistency 216a.

It is noted that, although as depicted in FIG. 2A, the LML 220a is embedded in the first service instance 212a, and the first LML instance 222a and the first LML persistency 224a are independent from the database 214a and the first service persistency 216a, implementations of the present disclosure are not limited thereto. In some implementations, the LML 220a can be an independent module connected to the first service instance 212a and the first LML instance 222a and the first LML persistency 224a could be merged and be part of the database 214a and the first service persistency 216a, respectively.

With reference to the above example, in which the client device 102b requests access to the data record 124 located in service persistency 120b in FIG. 1, when the second service instance 212b receives a request for access to a data record (e.g. data record X), the second service instance 212b determines whether the requested data record X is available in the second service persistency 216b, locally. If the data record X is not available locally, the second service instance 212b sends a request to the second LML instance 222b (or service instance hosted in other server system such as the first service instance 214a) to retrieve the data record X.

FIG. 2B depicts a conceptual architecture 200' which is similar to the architecture 200 depicted in FIG. 2A. The conceptual architecture 200' represents a distributed database scenario, in which a data record can be stored in multiple databases. In the example of FIG. 2B, distributed databases 214a', 214b' are provided, across which one or more data records are distributed. That is, for example, a data record can be stored in more than one distributed database/datacenter (i.e., multiple locations per data record). In some implementations, the transfer process of the present disclosure includes copying a data record to a destination without deleting the data record from a current datacenter. In some implementations, the transfer process within the distributed datacenters can include copying the data record to more than one destination with or without deleting the data record from the current datacenter.

Figure 3A:
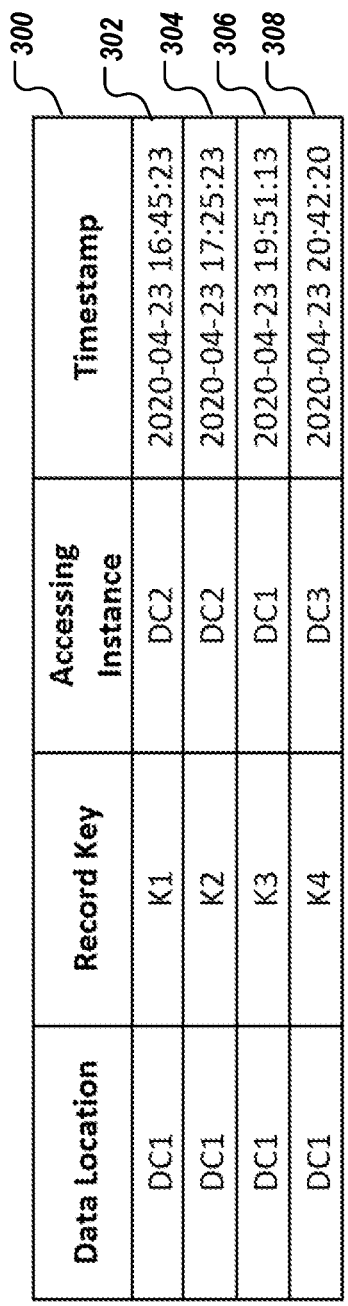

FIGS. 3A-3C depict example tables illustrating an example of latency minimization in accordance with implementations of the present disclosure. As described herein, a LML instance executing within a datacenter (e.g., the first LML instance 222a in the datacenter DC1) receives access information from a service instance (e.g., the first service instance 212a via the monitoring of the LML 220a). FIG. 3A depicts a table 300 representing example access information. In the table 300, the access information represents access requests to data records having record keys K1-K4 (referred to as the data records K1-K4), which are stored in a first datacenter (DC1).

In the example of FIG. 3, the access data includes, for each data record, a timestamp and a datacenter identifier. Accordingly, each entry (row) in the table 300 indicates, which datacenter sent an access request and the time (timestamp) of the access request, for a respective data record. In the table 300, a row 302 represents an access request from a second datacenter (DC2) to DC1 for the data record with key K1, a row 304 represents an access request from DC2 to DC1 for the data record with key K2, a row 306 represents an access request from within DC1 for the data record K3, and a row 308 represents an access request from a third datacenter (DC3) to DC1 for the data record with key K4. In the example of table 300, the rows 302, 304, 308 represent remote accesses and the table 306 represents a local access. The table 300 can be stored locally in DC1 (e.g., in the first LML persistency 224a). As described herein, the access data of table 300 can be used to determine migration of data records between datacenters.

In some implementations, sets of metrics corresponding to each of the data records may include but are not limited to a number of local accesses, a number of remote accesses, a percentage of local accesses, a percentage of remote accesses, a number and a percentage of remote accesses from particular datacenter, a number and a percentage of accesses of the same data record stored in other datacenters, and latency of the accesses. In some examples, and as described herein, the sets of metrics are calculated periodically (e.g., every X minute(s), every day, every week). In some examples, and as also described herein, the sets of metrics are calculated in response to an event (e.g., an access request). In some examples, metrics in the sets of metrics can be calculated as a moving average. For example, the number of local accesses and remote accesses from each of the datacenters are calculated (e.g., by the LML instance) every 10 minutes. Also, the moving averages of the number of local accesses and remote accesses within the last 2 hours are calculated. Then, metrics such as the percentage of local accesses and remote accesses from each of the datacenters can be calculated based on the moving averages of the number of local accesses and remote accesses.

FIG. 3B depicts an example table 310 including example sets of metrics based on access data for data records stored in DC1, including data records depicted in FIG. 3A. In the table 310, a row 312 represents percentages of access requests for the data record with key K1 from each of DC1, DC2, and DC3, a row 314 represents percentages of access requests for the data record with key K2 from each of DC1, DC2, and DC3, a row 316 represents percentages of access requests for the data record K3 from each of DC1, DC2, and DC3, a row 318 represents percentages of access requests for the data record with key K4 from each of DC1, DC2, and DC3, and a row 320 represents percentages of access requests for the data record with key K5 from each of DC1, DC2, and DC3. In the example depicted in FIG. 3B, the datacenters DC1, DC2, DC3 are non-distributed database system. That is, the example of FIG. 3B represents the example use case of data records being stored in only one location across the datacenters DC1, DC2, DC3.

In accordance with implementations of the present disclosure, the sets of metrics are used to selectively move data between DC1, DC2, DC3. In the example of FIG. 3B, the sets of metrics are evaluated to determine an action for each data record. In the context of non-distributed database systems, example actions can include, without limitation, moving a data record from one datacenter to another, or leaving the data record in its current datacenter. Thus, the transfer process herein includes a move process, which selectively pushes the data record to a new location and deletes the data record from the current location.

In some implementations, first logic is executed to determine whether to execute the transfer process for one or more data records stored in a datacenter. In some examples, the first logic is executed at each location (L) (e.g., by a LML instance within a datacenter) and includes the following example flow:

(1) For each the data record Y stored locally at location L, calculate a parameter access_from_location(X) as the sum of number of accesses from each location X (i.e., each of the datacenters that request access, both local and remote) to data record Y;

(2) Determine a location X_max, which has the greatest numbers of accesses to the data record Y (or the moving average thereof) among all locations X; and (3) If the parameter "access_from_location(X_max)" is Z % (e.g., Z=10) higher than the parameter "access_from_location(L)" (i.e., the number of the local accesses), execute the move process to push the data record Y to the location X_max and delete from location (L).

The first logic is described by way of example with reference to the table 310 depicted in FIG. 3B. Executing the first logic, the data record with key K1 is moved to DC2, because the data record with key K1 is nearly solely accessed by the service instance hosted in DC2. Thus, the data record with key K1 is also removed (deleted from) DC2). Also, the data record with key K2 is moved to DC2, because the percentage of remote accesses from DC2 is more than 10% (i.e., Z=10) higher than the percentage of local accesses (i.e., access requests from DC1). Thus, the data record with key K1 is also removed (deleted from) DC2 (opt-out). The data records with keys K3-K5 are kept in the datacenter DC1, because no accesses from other locations (datacenters) meet the condition for transfer.

In some examples, if multiple datacenters each have remote accesses Z % higher than the datacenter storing the data record being considered, the data record is moved to the datacenter having the highest percentage. For example, if for a particular data record stored in DC1, the access percentages were provided as DC1=18%, DC2=42%, DC3=40%, both DC2 and DC3 exceed the example of 10% higher than DC1. In this example, the data record is moved to DC2 (and deleted from DC1), because DC2 has a higher percentage than DC3.

FIG. 3C depicts an example table 330 with the sets of metrics following the example table 310 depicted in FIG. 3B. The example of table 330, however, is based on the example use case of a distributed database system. That is, data records can be stored in multiple locations. In this example, the transfer process includes a push process and an opt-out process. In some examples, the push process and the opt-out process can be determined and executed independently.

In some implementations, for a distributed database system, second logic is executed to determine whether to execute the transfer process to the data records stored locally in the datacenter. In some examples, the second logic is executed at each location (L) (e.g., by a LML instance within a datacenter) and includes the following example flow:

(1) For each of data record Y stored locally at location L, calculate the parameter "access_from_location(X)" as the sum of number of accesses from location X (i.e., each of the datacenters that request access, both local and remote) to data record Y;

(2) For each data record Y, calculate the parameter "global_sum_local_access", as the sum of number of accesses to the data record Y of all the datacenters that store the data record Y;

(3) For each of the locations X that had accessed data record Y stored in location L:
  If access_from_location(X)/global_sum_local_access>Z % (e.g., Z=10), push the data record Y to location X; and
  If access_from_location(L)/global_sum_local_access<=W % (e.g., W=5%), opt-out of the data record Y from location L.

The second logic is described by way of example with reference to the table 330 depicted in FIG. 3C. In the example of FIG. 3C, it is noted that data records K1-K5 are only stored in the datacenter DC1. That is, although a distributed database system is considered, the data records of the example of FIG. 3C happen to each only be stored in DC1. In this examples, the parameter "global_sum_local_access" equals to the total number of access to each of the data records having keys K1-K5. As a result, the computation of "access_from_location(X)/global_sum_local_access" equals to percentage of accesses from location X. By executing the second logic, it is determined that data record with key K2 is to be pushed (copied) to DC2, because the percentage of remote accesses from DC2 is higher than 10% (i.e., Z=10). The data record with key K2 is also opted-out from DC1 (e.g., deleted from DC1), because the percentage of the local accesses is less than 5% (e.g., W=5). Also in this example, because the percentage of accesses from DC2 is higher than 10% and the percentage of the local accesses is still greater than 5%, the data record with key K2 is pushed to the DC2 and is still kept in DC1. Consequently, the data record with key K2 is distributed in that it is stored at multiple locations. In this example, the data record with key K3 is pushed to the DC2 and DC3, because percentage of accesses from each of DC1, DC2, DC3 are above 10%. The data records with key K4 and key K5 are pushed to DC3 and DC2, respectively, based on the same criterion.

It should be understood that the thresholds (e.g., 5%, 10% and 20%) in the first logic and the second logic are provided as examples and can be adjusted to any appropriate value.

In some implementations, a damping factor is added to the thresholds to avoid frequent executions (oscillations) of the transfer process. Such frequent executions can result in data records frequently being pushed back and forth between the datacenters. In some examples, the thresholds are provided as a sum of a fixed threshold value (e.g., 10%) and a dynamic damping factor (e.g., Q % that reduces over time). By way of non-limiting example, the damping factor can be a function of time, initially being set as 50% and gradually decreases to 0 in a time period (e.g., 2 hours). The damping factor can be reset (e.g., reset to 50%) for a respective data record after execution of a transfer process for the data record.

In some implementations, the sets of metrics calculated by the LML instances can include information regarding network latency. FIG. 4 depicts an example table 400 depicting example network latencies for respective data records and requesting datacenters. In this example, the network latency can be measured by monitoring an instance-to-instance communication. For example, when a service instance hosted in DC2 (e.g., the second service instance 220b shown in FIG. 2A) sends a request for access to the data record with the key K1 stored in DC1, the service instance would read the current timestamp and append this timestamp (hereafter, the sender timestamp) to the request for accessing the data record with the key K1. When the service instance hosted in DC1 (e.g., the first service instance 212a) receives the request from the service instance in DC2, the service instance in DC1 records the current timestamp and extracts the sender timestamp from the request. Thus, the service instance can compute the network latency based on the current timestamp and the sender timestamp. Once the network latency is computed, it can be stored locally (e.g., stored in the first LML persistency 224a). In some examples, the network latency for a datacenter and data record pair can be used as a reference for the service instance to find the closest location to request a data record, if that data record is not available locally. In some implementations, the process of appending the sender timestamp, extracting the sender timestamp and calculating network latency are executed by the LML instances hosted in the datacenters. In practice, the measurement of network latency often initiates from the application hosted in one datacenter and calculate for the network latency by the same application after receiving the response from another datacenter, which is time-consuming and is not straightforward for the service instance to derive such information.

FIGS. 5A-5C depict example tables illustrating another example of latency minimization in accordance with implementations of the present disclosure. FIG. 5A depicts an example table 500 providing a holistic view of sets of metrics regarding access information of data records having keys K1-K6 and the corresponding actions determined based on the sets of metrics in accordance with implementations of the present disclosure. In the example table 500, the sets of metrics regarding the access information includes the number of local accesses, the number of remote accesses from each of the datacenters and the total number of local accesses of each data record. It is noted that, in this example, the total number of local accesses is determined as the sum of the number of local accesses of all of the datacenters storing the same data record. For example, the data record with the key K1 is only stored in DC1, so the total number of local accesses equals to the number of accesses in DC1. On the other hand, the data record with the key K5 is distributed across DC1-DC3, so the total number of local accesses is determined as the sum of all of the local accesses to the data record K5 in each of DC1-DC3.

As described in further detail herein, an example table 502 of FIG. 5B depicts sets of metrics after one or more transfer processes have been executed based on the sets of metrics depicted in the table 500 of FIG. 5A. Further, an example table 502 of FIG. 5C depicts sets of metrics as recorded by a LML instance located within DC3.

In further detail, FIGS. 5B and 5C depict the example table 502 and the example table 504 of the local view of the sets of metrics regarding the access information respectively from the datacenter DC1 and DC3 and the corresponding actions based on the metrics regarding the access information. In some examples, for the distributed data records, such as the data records with the key K5 and the key K6, while total number of local accesses can be derived through the communications between the LML instances hosted in the datacenters, the specific number of remote accesses to the data records stored in other datacenters may still be unknown. For example, and with reference to the data record with the key K5 in the FIGS. 5A and 5C, it is shown that the numbers of accesses stored in the datacenter DC2 and DC3 are not available locally in the datacenter DC1 (i.e., the entries are zeros in the example table 502 shown in FIG. 5B).

In some implementations, determining whether to execute the transfer process for a data record is made locally by the LML instance (or the service instance) of a datacenter. In some examples, the determination made by the LML instance is not affected by the limited metrics regarding the access information. For example, and with reference to the data record with the key K5 of FIG. 5B, the LML instance in DC1 analyzes the sets of metrics and determines that the data record stored in DC1 has received a significant number of access requests from DC4 and DC5, but none from the DC6, DC7, DC8. Therefore, the requests from the datacenter DC6, DC7, DC8 may be handled by DC2 and DC3. In this example, the LML instance in DC1 continues on determining whether to transfer the data record K5 to DC4 and DC5 based on the set of metrics regarding the access information. For example, using the second logic described herein, the data record with the key K5 is pushed to DC4 and DC5, because there are more than 10% of the accesses from each of DC4 and DC5. The local accesses from the DC1 is 33%, so the LML instance still maintains the data record with the key K5 in DC1.

With reference to the example table 504 in FIG. 5C, for the data record with the key K5 stored in DC3, there are 500 instances of local accesses from DC3 and 2500 instances of remote accesses from DC6. Consequently, the LML instance in DC3 would push the data record with the key K5 to DC6. As a result, the data record with the key K5 is stored in each of DC1, DC2, DC3, DC6. Assuming all of the access information remains the same, in the next iteration (e.g., 10 minutes later), the total number of local accesses becomes 10000 instances, the datacenter DC1, DC2, DC3, DC6 are all storing the data record with the key K5. As a result, the percentage of local accesses from the DC1 becomes 5% and the LML instance in DC1 would then opt-out of storing the data record with the key K5 in DC1. Similarly, the LML instance in DC3 would also opt-out of storing the data record with the key K5 in DC3.

Referring to the example table 500 and the example table 502 with reference to the data record with the key K6, because the number of local accesses (i.e., 50 instances) from DC1 and DC3 are each below 5%, as compared to the total number of local accesses (5350 instances), the LML instances in each of DC1 and DC3 would decide to opt-out of storing the data record with the key K6 in DC1 and DC3. After each of DC1-DC8 has made the determination regarding whether to execute the transfer process to the data record with the key K6, the data record with the key K6 would only be stored in DC5.

In some examples, if a data record is stored at several locations, the location storing the data record might not be the closest to the requestor (e.g., requesting a data record from datacenter in Amsterdam rather than datacenter in Munich). However, the network latency might still be acceptable (e.g., below 0.2 seconds) and the response time is below the desired KPIs (e.g., below 1 second). In this case, the transfer processes to the data records are un-necessary and could be avoided. By avoiding un-necessary moves of data records, load on the system network is mitigated.

In some implementations, the network latency is also monitored and considered in the sets of metrics to avoid un-necessary moves of the data records. Specifically, the transfer process would not be executed if the locations of the datacenters are "close enough" to each other so that remote access to one data record is still acceptable from a network latency perspective. In some implementations, the network latencies between the datacenters can be computed from request for access to the locally stored data records, for example, using the measurement of the instance-to-instance communications depicted in FIG. 4. In some implementations, a moving average of the network latencies can be computed periodically (e.g., every 10 minutes) taking the data over a predetermined period of time (e.g., the last 2 hours). As described herein, the local instances (e.g., the service instance and/or the LML instance) can read the network latencies and use the network latencies as a reference to find the closest location to request a data record, if that data record is not available locally. In some implementations, a related observation can be made. The access requests of a data record from one location always go to the same other location, then this other location must be the location that has the lowest network latency, if the data record is available at all others. However, this is the exceptional case as most records are only stored in a subset of available locations. In some implementations, a comprehensive global latency map can be constructed based on various access patterns to the locally stored data records and sufficient information from communicating with other datacenters.

FIGS. 6A and 6B depict an example table 600 and an example table 602, respectively, illustrating another example of latency minimization in accordance with implementations of the present disclosure. The example tables 600, 602 can be representative of global latency maps for DC1 and DC8, respectively. By combining all local measurements and communication within DC1-DC10, groups of locations can be formed that are "close enough" to each other with respect to network latency. It is noted that the term "close enough" described herein is defined by the similarity of the network latencies rather than the physical distances. For example, in the example table 600 and the example table 602, DC1-DC3 are in the "Asia" group, DC4-DC6 are in the "Europe" group, and DC7-DC10 are in the "US" group, and the network latencies of the datacenters in the same group are similar to each other.

In some implementations, within one of the groups, it is not necessary to replicate or push the same data records as the remote access is fast enough. Therefore, the individual locations within one group can be regarded as a single "group location" when applying the first logic or the second logic described herein (e.g., determining whether to move data records). Within one of the groups, an arbitrary location/datacenter can represent the group. In other words, datacenters within the same group can be treated as one super datacenter during the determination of whether to move the data record to a new location. For example, the LML instance hosted in DC1 may decide not to move a data record to DC3, because DC1 and DC3 are in the same group. Here, the LML instance hosted in DC3 only needs to move a data record to DC7, even if the datacenter DC7 and DC8 both have significant numbers of accesses to that data record.

In some implementations, access patterns can be found through spectral analysis based on the access information of the data records in all of the datacenters. Typically, an access pattern with frequency of one day, one week, one month, one quarter or one year is expected. The pattern may include but are not limited to: people (and business induced by people) that follows a daily rhythm (e.g. daytime, night-hours); people have weekly schedule (of days off etc.); and business processes require monthly, quarterly, yearly reporting and planning.

In some implementations, the transfer processes can be made in an event-driven manner. That is, if an event-stream is available, events can be correlated with transfer process of the data records. For example, the event-stream includes data representative of travel of users. If a user travels to another location that is closer to the DC2, the data records that the user frequently accessed (e.g., in DC1) are to be moved to DC2 to follow the user. If the transfer process of the data record is set to be correlated with user travel, a new event "user travels to location DC2" can be used to proactively move the data record to DC2.

In some implementations, the event may include marketing campaigns. For example, if a marketing campaign for a product ProdX in region RX is launched, the follow-up accesses on master data catalogs and creation of leads related to the product is increasing in the datacenter that is accessed from the region RX. If the transfer process of the data records correlates to the marketing events (with some business attributes like product and region), the proactive transfer process can be configured to execute when the event is retrieved.

In some implementations, the "proactive" actions (e.g., the proactive transfer process of the data records) can be monitored and further adjusted. When a proactive action is determined and configured, the efficiency of the proactive transfer process can be monitored. The indexes of efficiency may include but are not limited to: (1) the network latency per request (if the moving average of the network latency increases over time, re-execute the analysis to identify if the proactive moves need to be adjusted); and (2) repeatedly re-execute the analysis with different frequencies and events (If correlation is below the threshold at which it has been set, remove the proactive transfer process).

Figure 7:
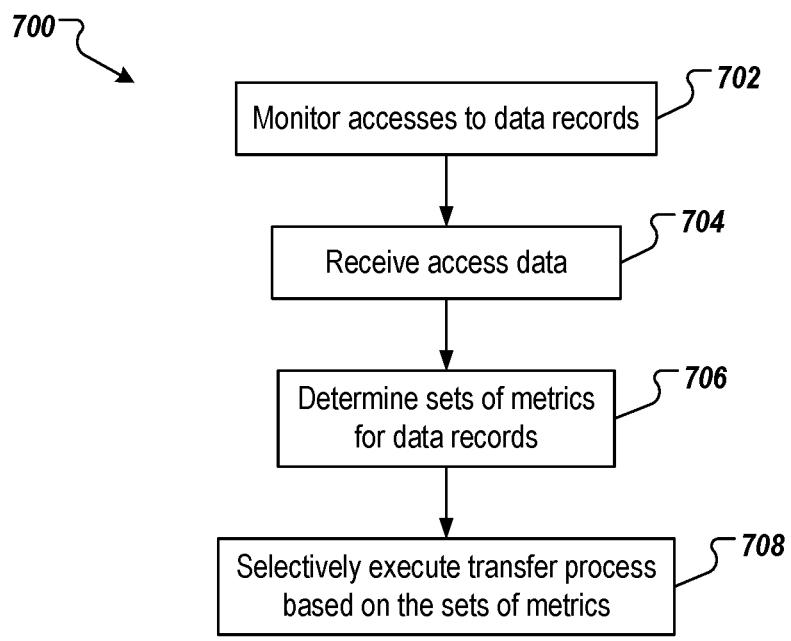
FIG. 7 depicts an example process that can be executed in accordance with implementations of the present disclosure.

FIG. 7 depicts an example process 700 that can be executed in accordance with implementations of the present disclosure. In some implementations, the example process 700 is executed for reducing latency in accessing data records across datacenters. In some examples, the example process 700 is provided using one or more computer-executable programs executed by one or more computing devices (e.g., executed by LML instances within datacenters). For clarity of presentation, the description that follows generally describes the example process 700 in the context of the system 100 illustrated in FIG. 1.

Accesses to data records are monitored (702). For example, and as described herein, a LML plug-in to a first service executed within a first datacenter, monitors accesses to data records stored in the first datacenter. In some examples, access data is representative of the accesses to a data record stored in the first datacenter, the accesses including local accesses executed by the first service and remote accesses executed by a second service executed within a second datacenter. Access data is received (704). For example, and as described herein, a LML instance executed within the first datacenter, receives the access data from the LML plug-in to the first service. Sets of metrics for data records are determined (706). For example, and as described herein, the LML instance determines a set of metrics for each data record stored in the first datacenter based on the local accesses and the remote accesses. In some examples, the sets of metrics are determined at predetermined intervals of time. In some examples, the sets of metrics are determined in response to occurrence of an event. One or more transfer processes are selectively executed (708). For example, and as described herein, one or more data records are selectively transferred based on respective sets of metrics. For example, a transfer process is selectively executed based on a set of metrics to copy a respective data record to a second datacenter. In some examples, the respective data record is deleted from the first datacenter.

Figure 8:
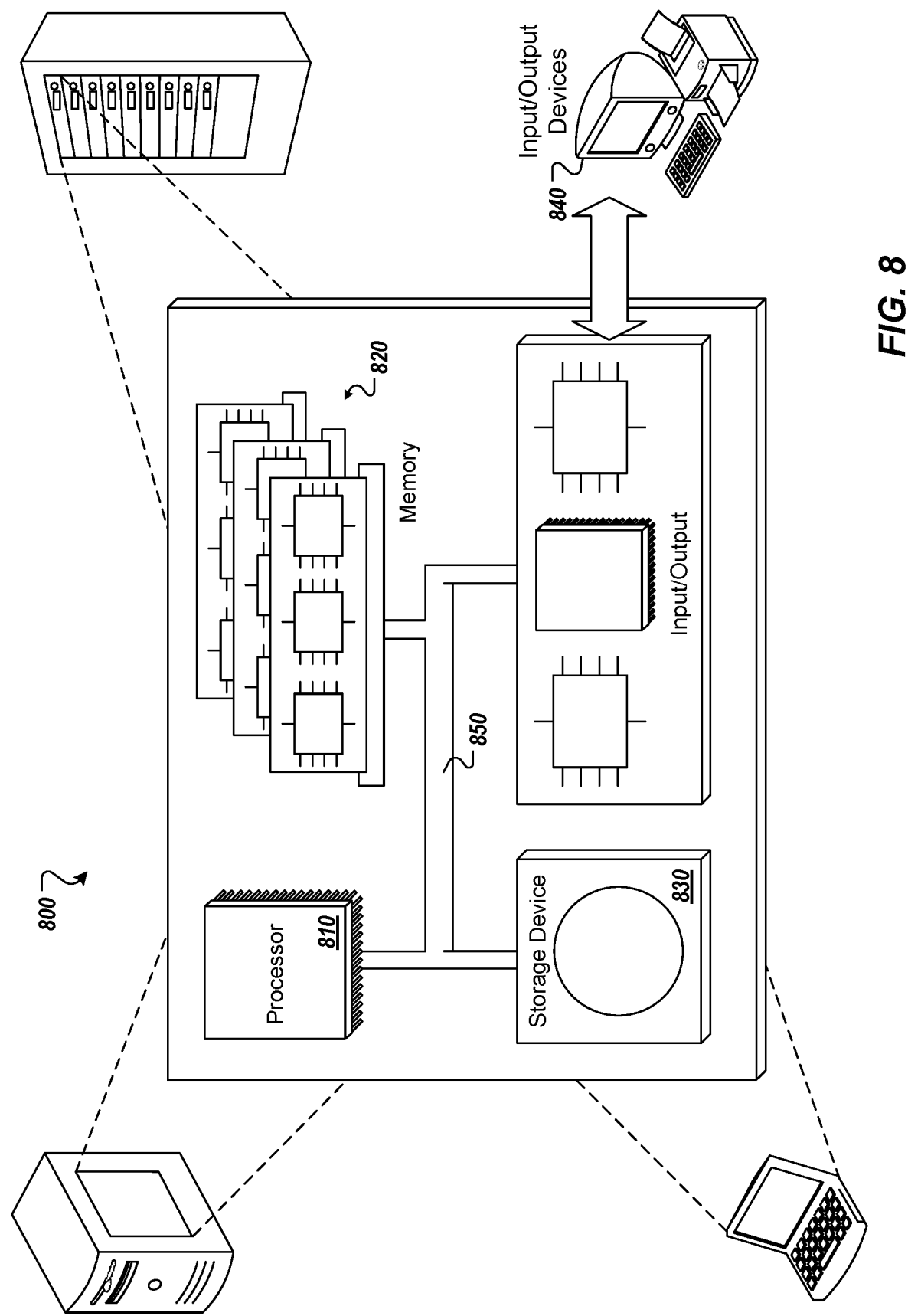
FIG. 8 is a schematic illustration of example computer systems that can be used to execute implementations of the present disclosure.

Referring now to FIG. 8, a schematic diagram of an example computing system 800 is provided. The system 800 can be used for the operations described in association with the implementations described herein. For example, the system 800 may be included in any or all of the server components discussed herein. The system 800 includes a processor 810, a memory 820, a storage device 830, and an input/output device 840. The components 810, 820, 830, 840 are interconnected using a system bus 850. The processor 810 is capable of processing instructions for execution within the system 800. In some implementations, the processor 810 is a single-threaded processor. In some implementations, the processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable medium. In some implementations, the memory 820 is a volatile memory unit. In some implementations, the memory 820 is a non-volatile memory unit. The storage device 830 is capable of providing mass storage for the system 800. In some implementations, the storage device 830 is a computer-readable medium. In some implementations, the storage device 830 may be a floppy disk device, a hard disk device, an optical disk device, or a tape device. The input/output device 840 provides input/output operations for the system 800. In some implementations, the input/output device 840 includes a keyboard and/or pointing device. In some implementations, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for reducing latency in accessing data records across multiple datacenters, the method being executed by one or more processors and comprising:
   monitoring, by a latency minimization layer (LML) plug-in to a first service executed within a first datacenter, accesses to provide access data representative of the accesses to a data record stored in the first datacenter, the accesses comprising local accesses executed by the first service and remote accesses executed by a second service executed within a second datacenter;
   receiving, by a LML instance executed within the first datacenter, the access data from the LML plug-in to the first service;
   determining, by the LML instance, a set of metrics for the data record based on the local accesses and the remote accesses in a first time period; and
   selectively executing a transfer process based on the set of metrics to copy the data record to the second datacenter,
   wherein determining the set of metrics comprises:
      calculating a number of local accesses, a number of remote accesses, and a total number of accesses over the first time period, and
      determining a percentage of local accesses and a percentage of remote accesses; and
   wherein selectively executing a transfer process comprises executing the transfer process in response to a difference between the percentage of remote accesses and the percentage of local accesses exceeds a first threshold.

2. The method of claim 1, wherein the first threshold includes a dampening value that changes over time.

3. The method of claim 1, wherein the data record is stored in both the first datacenter and the second datacenter after execution of the transfer process.

4. The method of claim 3, further comprising:
   receiving, from the second datacenter, a total number of accesses of the data record stored in the second datacenter at in a second time period; and
   selectively executing another transfer process based on the total number of accesses from the second datacenter.

5. The method of claim 1, further comprising deleting the data record stored in the first datacenter.

6. The method of claim 1, wherein determining a set of metrics comprises:
   calculating the latency of remote accesses from the second datacenter; and
   selectively executing the transfer process based on the latency of the remote accesses the second datacenter.

7. A non-transitory computer-readable storage medium coupled to one or more processors and having instructions stored thereon which, when executed by the one or more processors, cause the one or more processors to perform operations for reducing latency in accessing data records across datacenters, the operations comprising:
   monitoring, by a latency minimization layer (LML) plug-in to a first service executed within a first datacenter, accesses to provide access data representative of the accesses to a data record stored in the first datacenter, the accesses comprising local accesses executed by the first service and remote accesses executed by a second service executed within a second datacenter;
   receiving, by a LML instance executed within the first datacenter, the access data from the LML plug-in to the first service;

determining, by the LML instance, a set of metrics for the data record based on the local accesses and the remote accesses in a first time period; and selectively executing a transfer process based on the set of metrics to copy the data record to the second datacenter, wherein determining the set of metrics comprises:

calculating a number of local accesses, a number of remote accesses, and a total number of accesses over the first time period, and determining a percentage of local accesses and a percentage of remote accesses; and wherein selectively executing a transfer process comprises executing the transfer process in response to a difference between the percentage of remote accesses and the percentage of local accesses exceeds a first threshold.

8. The computer-readable storage medium of claim 7, wherein the first threshold includes a dampening value that changes over time.

9. The computer-readable storage medium of claim 7, wherein the data record is stored in both the first datacenter and the second datacenter after execution of the transfer process.

10. The computer-readable storage medium of claim 9, wherein operations further comprise:

receiving, from the second datacenter, a total number of accesses of the data record stored in the second datacenter at in a second time period; and selectively executing another transfer process based on the total number of accesses from the second datacenter.

11. The computer-readable storage medium of claim 7, wherein operations further comprise deleting the data record stored in the first datacenter.

12. The computer-readable storage medium of claim 7, wherein determining a set of metrics comprises:

calculating the latency of remote accesses from the second datacenter; and selectively executing the transfer process based on the latency of the remote accesses the second datacenter.

13. A system, comprising:

a computing device; and a computer-readable storage device coupled to the computing device and having instructions stored thereon which, when executed by the computing device, cause the computing device to perform operations for natural language explanations for reducing latency in accessing data records across datacenters, the operations comprising:

monitoring, by a latency minimization layer (LML) plug-in to a first service executed within a first datacenter, accesses to provide access data representative of the accesses to a data record stored in the first datacenter, the accesses comprising local accesses executed by the first service and remote accesses executed by a second service executed within a second datacenter;

receiving, by a LML instance executed within the first datacenter, the access data from the LML plug-in to the first service;

determining, by the LML instance, a set of metrics for the data record based on the local accesses and the remote accesses in a first time period; and selectively executing a transfer process based on the set of metrics to copy the data record to the second datacenter, wherein determining the set of metrics comprises:

calculating a number of local accesses, a number of remote accesses, and a total number of accesses over the first time period, and determining a percentage of local accesses and a percentage of remote accesses; and wherein selectively executing a transfer process comprises executing the transfer process in response to a difference between the percentage of remote accesses and the percentage of local accesses exceeds a first threshold.

14. The system of claim 13, wherein the first threshold includes a dampening value that changes over time.

15. The system of claim 13, wherein the data record is stored in both the first datacenter and the second datacenter after execution of the transfer process.

16. The system of claim 15, wherein operations further comprise:

receiving, from the second datacenter, a total number of accesses of the data record stored in the second datacenter at in a second time period; and selectively executing another transfer process based on the total number of accesses from the second datacenter.

17. The system of claim 13, wherein operations further comprise deleting the data record stored in the first datacenter.

* * * * *